US012408629B2

(12) United States Patent
Mullin et al.

(10) Patent No.: US 12,408,629 B2
(45) Date of Patent: Sep. 9, 2025

(54) PET MUZZLE WITH TOPOLOGY OPTIMIZATION

(71) Applicant: The Company of Animals Limited, Chertsey (GB)

(72) Inventors: Keith Mullin, La Jolla, CA (US); Christopher Taddei, Carlsbad, CA (US); Roger Mugford, Chertsey (GB); Andrew Groom, Bracknell (GB)

(73) Assignee: The Company of Animals Limited, Surrey (GB)

( * ) Notice: Subject to any disclaimer, the term of this patent is extended or adjusted under 35 U.S.C. 154(b) by 0 days.

(21) Appl. No.: 18/381,984

(22) Filed: Oct. 19, 2023

(65) Prior Publication Data

US 2024/0130331 A1    Apr. 25, 2024
US 2024/0224941 A9    Jul. 11, 2024

Related U.S. Application Data

(60) Provisional application No. 63/417,661, filed on Oct. 19, 2022.

(51) Int. Cl.
    *A01K 25/00*      (2006.01)
    *B33Y 80/00*      (2015.01)
(52) U.S. Cl.
    CPC .............. *A01K 25/00* (2013.01); *B33Y 80/00* (2014.12)
(58) Field of Classification Search
    CPC .............................. A01K 25/00; A01K 13/006
    USPC .................................................. 119/831–832
    See application file for complete search history.

(56) References Cited

U.S. PATENT DOCUMENTS

| | | | | |
|---|---|---|---|---|
| 545,207 | A | * | 8/1895 | Miller .................... A01K 25/00 119/832 |
| 868,145 | A | | 10/1907 | Swender |
| 1,068,971 | A | | 7/1913 | Brauer |
| 1,082,372 | A | * | 12/1913 | Thompson ............. A01K 25/00 119/831 |
| 1,297,753 | A | * | 3/1919 | Twitchell ............. A01K 13/006 54/80.3 |

(Continued)

FOREIGN PATENT DOCUMENTS

| | | | |
|---|---|---|---|
| BR | 102019020936 A2 | * | 4/2021 |
| CN | 113767864 A | * | 12/2021 |

(Continued)

OTHER PUBLICATIONS

Merged translation of DE_102009038842 (Year: 2011).*

(Continued)

*Primary Examiner* — Morgan T Jordan
(74) *Attorney, Agent, or Firm* — Tillman, Wright & Wolgin; James D. Wright; David R. Higgins

(57) ABSTRACT

A pet muzzle includes a muzzle body, including a cage, and a strap system. The strap system includes a neck strap section and two pairs of side strap sections, each including an upper and a lower section that are connected to each other at proximal ends and connected to the muzzle body at distal ends thereof. The connection locations on the muzzle body are arranged around a periphery of an open end thereof. The cage includes a plurality of elliptical or oval openings, including a mouth opening. A scavenger grille may be coupled in the mouth opening. The muzzle and grille are formed of material that is at least partially transparent.

20 Claims, 18 Drawing Sheets

(56) References Cited

U.S. PATENT DOCUMENTS

| | | | |
|---|---|---|---|
| 1,351,140 A | 8/1920 | Stoker | |
| 1,395,116 A * | 10/1921 | Johnson | A01K 19/00 |
| | | | 119/823 |
| 1,474,303 A | 11/1923 | Veres | |
| 1,511,339 A * | 10/1924 | Hord | A01K 25/00 |
| | | | 119/832 |
| 2,658,478 A | 11/1953 | Jones | |
| 3,000,351 A | 9/1961 | De Melo | |
| 3,173,401 A * | 3/1965 | Lupo, Sr. | A01K 25/00 |
| | | | 54/80.3 |
| 4,160,428 A | 7/1979 | Wilkinson | |
| 4,273,119 A * | 6/1981 | Marchello | A61D 7/04 |
| | | | 54/80.3 |
| 4,603,659 A | 8/1986 | Helphrey | |
| 5,099,800 A | 3/1992 | Fitzpatrick et al. | |
| 5,218,929 A * | 6/1993 | Michunovich | A01K 25/00 |
| | | | 119/832 |
| 5,249,570 A * | 10/1993 | Cox | A01K 25/00 |
| | | | 128/914 |
| 5,785,008 A | 7/1998 | Liu | |
| 6,082,309 A * | 7/2000 | Wexler | A01K 25/00 |
| | | | 119/837 |
| 6,119,633 A * | 9/2000 | Berke | A01K 25/00 |
| | | | 119/908 |
| 6,227,148 B1 * | 5/2001 | Wexler | A01K 25/00 |
| | | | 119/837 |
| 6,832,581 B1 * | 12/2004 | Vaugn | A01K 13/006 |
| | | | 119/834 |
| 6,925,966 B1 * | 8/2005 | Wexler | A61D 9/00 |
| | | | 119/815 |
| 7,444,960 B1 * | 11/2008 | Williams | A01K 25/00 |
| | | | 119/761 |
| 7,690,332 B1 | 4/2010 | Merbeth | |
| 7,802,572 B2 * | 9/2010 | Hahne | A41D 13/1192 |
| | | | 128/857 |
| 7,891,321 B2 * | 2/2011 | Slank | A01K 25/00 |
| | | | 119/831 |
| D659,303 S | 5/2012 | Mugford | |
| 8,596,224 B2 | 12/2013 | Taylor | |
| 10,172,326 B1 * | 1/2019 | Cogley | A01K 25/00 |
| D968,722 S * | 11/2022 | Yan | D30/152 |
| D969,419 S | 11/2022 | Wang | |
| 2001/0009143 A1 * | 7/2001 | Wexler | A01K 25/00 |
| | | | 119/837 |
| 2008/0264350 A1 * | 10/2008 | Frevola | A01K 25/00 |
| | | | 119/831 |
| 2010/0024743 A1 | 2/2010 | Wang | |
| 2010/0083914 A1 * | 4/2010 | Amaya | B68B 5/06 |
| | | | 119/850 |
| 2011/0185981 A1 * | 8/2011 | Mitton | A01K 25/00 |
| | | | 119/832 |
| 2013/0252192 A1 * | 9/2013 | Cogley | A61D 5/00 |
| | | | 433/1 |
| 2017/0215383 A1 * | 8/2017 | Moffat | A01K 15/02 |
| 2017/0311571 A1 | 11/2017 | Lewsley et al. | |
| 2018/0332825 A1 | 11/2018 | Cameron | |
| 2020/0337270 A1 * | 10/2020 | Pyo | A01K 25/00 |
| 2021/0037788 A1 * | 2/2021 | Chester | A01K 25/00 |

FOREIGN PATENT DOCUMENTS

| | | | | |
|---|---|---|---|---|
| CN | 114885076 A * | 8/2022 | | A01K 25/00 |
| DE | 174447 C | 9/1906 | | |
| DE | 102009038842 B3 * | 6/2011 | | A01K 25/00 |
| DE | 202018100328 U1 * | 3/2018 | | |
| DE | 202018100178 U1 * | 4/2018 | | A01K 25/00 |
| DE | 202024001646 U1 * | 1/2025 | | |
| GB | 116975 A | 7/1918 | | |
| KR | 20200000280 U * | 2/2020 | | |
| KR | 20210117592 A * | 9/2021 | | |
| WO | WO-2008124288 A1 * | 10/2008 | | C08G 18/4854 |
| WO | WO-2019210337 A1 * | 11/2019 | | A01K 25/00 |
| WO | 2024084431 A1 | 4/2024 | | |

OTHER PUBLICATIONS

Merged translation of DE_202018100178 (Year: 2018).*
Merged translation of DE_202018100328 (Year: 2018).*
Merged translation of WO-2019210337-A1 (Year: 2019).*
Merged translation of KR_20200000280 (Year: 2020).*
Merged translation of BR_102019020936 (Year: 2021).*
Merged translation of CN_113767864 (Year: 2021).*
Merged translation of KR_20210117592 (Year: 2021).*
Merged translation of CN_114885076 (Year: 2022).*
Partial "International Search Report" of the International Search Authority (EPO) in The Company of Animals Limited, International Patent Application Serial No. PCT/IB2023/060569, dated Jan. 23, 2024 (Jan. 23, 2024) (17 pages).
"International Search Report" and "Written Opinion of the International Search Authority" (ISA/EP) in The Company of Animals Limited, International Patent Application Serial No. PCT/IB2023/060569, dated Mar. 15, 2024 (22 pages).

* cited by examiner

PET MUZZLE WITH TOPOLOGY OPTIMIZATION

CROSS-REFERENCE TO RELATED APPLICATION

For purposes of the United States, the present application is a U.S. nonprovisional patent application of, and claims priority under 35 U.S.C. § 119(e) to, U.S. provisional patent application Ser. No. 63/417,661, filed Oct. 19, 2022 and entitled "PET MUZZLE WITH TOPOLOGY OPTIMIZATION," which provisional patent application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to animal muzzles and safety equipment, more specifically, to an improved animal muzzle with topology optimization providing a lighter and stronger muzzle than what is currently available.

Background

Dog muzzles have been in use for years. Typically, such inventions and prior art include dog muzzles made of wire, leather, cloth, plastic and the like. Traditionally, such muzzle devices are made from materials that are opaque, and in many cases, heavy and cumbersome. The weight and/or bulk can make the dog uncomfortable, and in some cases can injure the dog.

When dog muzzles are opaque, users, such as dog trainers and pet owners cannot see much of the dog's face or expressions to understand the dog's disposition. Under normal circumstances, movement of the lips provides onlookers with important indicators of the dog's emotional state, such as their anxiety level or likely warning of intention to launch an aggressive attack.

Various coloring and pigmentation of a dog's lips or nose can be used to determine or evaluate the health conditions of the dog. There can be drastic changes in nose pigmentation, changes in texture or moisture, or is crusting, bleeding or itching where these types of nose conditions can be an indication of something serious, such as cancer, lupus infection or an immune disease known as vitiligo. Therefore, being able to see a dog's nose while wearing a muzzle has advantages when evaluating the health of a dog.

As stated above, existing designs and materials for construction of muzzles obscure the dog's facial expression and facial features such as the lips and nose, and these same designs may be heavy and bulky and potentially harmful to a dog. Thus, a need exists for a more comfortable, light weight, non-irritating muzzle for a dog contributing to a happier healthier pet all while providing safety to others from biting dogs.

SUMMARY OF THE PRESENT INVENTION

Broadly defined, the present invention according to one aspect relates to a pet muzzle, including: a muzzle body having a closed distal end and an open proximal end, the muzzle body including a including a cage adapted to fit over a pet's muzzle and having airflow openings; and a strap system adapted to hold the cage in place over the pet's muzzle, the strap system having (i) a neck strap section having first and second ends and adapted to fit around a back of a pet's head, (ii) a first pair of side strap sections, the first pair of side strap sections being arranged to be disposed on a left side of the pet's head and including an upper side strap section and a lower side strap section, proximal ends of which are connected to each other at the first end of the neck strap section, and (iii) a second pair of side strap sections, the second pair of side strap sections being arranged to be disposed on a right side of the pet's head and including an upper side strap section and a lower side strap section, proximal ends of which are connected to each other at the second end of the neck strap section; wherein distal ends of the upper and lower side strap sections of the first and second pairs are attached to the muzzle body at connection locations arranged around a periphery of the open proximal end thereof.

In a feature of this aspect, the muzzle body further includes a snout band around the open proximal end thereof. In another feature of this aspect, the distal ends of the upper and lower side strap sections of the first and second pairs are attached to the snout band. In a further feature, the snout band includes a first upper slot and a first lower slot on a left side of the snout band and a second upper slot and a second lower slot on a right side of the snout band, and wherein the distal ends of the upper and lower side strap sections of the first and second pairs are attached to the snout band by routing each distal end through a respective slot.

In another feature of this aspect, a line segment, for each pair of side strap sections, is defined by a bottom of the upper connection location and a top of the lower connection location, a first vertex point is defined by an intersection of the upper strap section and the lower strap section, a second vertex point is defined by an intersection of the line segment and the lower strap section, a third vertex point is defined by an intersection of the line segment and the upper strap section, and wherein the first, second, and third vertex points define a scalene triangle. In further features, the interior angle at the first vertex point is between 32 and 42 degrees, the interior angle at the second vertex point is between 76 and 86 degrees, and the interior angle at the third vertex point is between 57 and 67 degrees; the interior angle at the first vertex point is between 35 and 39 degrees, the interior angle at the second vertex point is between 79 and 83 degrees, and the interior angle at the third vertex point is between 60 and 64 degrees; and the interior angle at the first vertex point is about 37 degrees, the interior angle at the second vertex point is about 71 degrees, and the interior angle at the third vertex point is about 62 degrees.

In another feature of this aspect, the muzzle body further includes a band cover wrapped around at least a portion of the snout band. In a further feature, the band cover is a fabric band cover wrapped around the entirety of the snout band and sewn thereto.

In another feature of this aspect, the first lower strap section is continuous with the first end of the neck strap section, the first upper strap section is attached thereto, the second lower strap section is continuous with the second end of the neck strap section, and the second upper strap section is attached thereto.

In another feature of this aspect, the neck strap section includes a buckle disposed in an intermediate portion thereof, the buckle providing removability and adjustability for the strap system.

Broadly defined, the present invention according to one aspect relates to a pet muzzle, including: a muzzle body, including a cage adapted to fit over a pet's muzzle, having a closed distal end and an open proximal end; and a strap system adapted to hold the cage in place over the pet's muzzle; wherein the cage is formed by a plurality of interconnected struts defining generally elliptical or oval airflow openings, the elliptical or oval openings including (i) a large elliptical or oval mouth opening arranged to be positioned adjacent a pet's mouth when the cage is held in place over the pet's muzzle, (ii) a plurality of elliptical or oval side openings on a left side of the cage, (iii) a plurality of elliptical or oval side openings on a right side of the cage, and (iv) one or more additional elliptical or oval openings along a bottom of the cage, the distal end of the cage, or a top of the cage.

In a feature of this aspect, the muzzle body further includes a snout band around the open proximal end thereof.

In another feature of this aspect, the elliptical or oval openings further include a nose opening at a top of the distal end of the cage. In further features, the plurality of elliptical or oval side openings on the left side of the cage include two to six elliptical or near-elliptical openings, and the plurality of elliptical or oval side openings on the right side of the cage include two to six elliptical or near-elliptical openings on the right side of the cage; the one or more additional elliptical or oval openings include zero to two elliptical or oval openings arranged in between the mouth opening and the nose opening at the distal end of the cage, zero to two elliptical or oval openings arranged along the top of the cage, and one to four elliptical or oval openings are arranged along the bottom of the cage; the one or more additional elliptical or oval openings include an elliptical or oval opening between the mouth opening and the nose opening and extending transversely across the distal end of the cage; the one or more additional elliptical or oval openings include a large elliptical or oval opening extending transversely across the bottom of the cage; and/or the one or more additional elliptical or oval openings include an elliptical or oval opening extending transversely across the top of the cage.

In another feature of this aspect, the cage and the snout band are of integrally-manufactured construction using identical material. In a further feature, the identical material is injection-molded material.

In another feature of this aspect, the cage is manufactured of material that has a visible light transmittance percentage (VLT %) of at least 50%. In further features, the cage is manufactured of material that has a visible light transmittance percentage (VLT %) of at least 70%; and/or the cage is manufactured of material that has a visible light transmittance percentage (VLT %) of at least 85%.

In another feature of this aspect, the struts have thickened portions around the edges of the openings and thinner portions in other areas, thereby enhancing structural performance while reducing material requirements.

Broadly defined, the present invention according to one aspect relates to a pet muzzle, including: a muzzle body, having a closed distal end and an open proximal end, having (i) a cage adapted to fit over a pet's muzzle and formed by a plurality of interconnected struts defining a plurality of airflow openings, and (ii) a snout band around the open proximal end, (iii) wherein the cage is manufactured of 50%; (b) a strap system adapted to hold the cage in place over the pet's muzzle; (c) whereby, when the pet puzzle is worn by the pet, a person in the vicinity thereof is able to see all or nearly all of the facial expressions of the pet through a combination of the airflow openings and the transparent material of the struts.

In a feature of this aspect, the cage is manufactured of material that has a visible light transmittance percentage (VLT %) of at least 50%.

In another feature of this aspect, the cage is manufactured of material that has a visible light transmittance percentage (VLT %) of at least 70%. In a further feature, the cage is manufactured of material that has a visible light transmittance percentage (VLT %) of at least 85%.

In another feature of this aspect, the cage and the snout band are of integrally-manufactured construction using identical material. In a further feature, the identical material is injection-molded material.

Broadly defined, the present invention according to one aspect relates to a pet muzzle, including: a muzzle body, including a cage adapted to fit over a pet's muzzle, having a closed distal end and an open proximal end, wherein the cage is formed by a plurality of interconnected struts defining a plurality of airflow openings, wherein the plurality of airflow openings includes a large mouth opening arranged to be positioned adjacent a pet's mouth when the cage is held in place over the pet's muzzle; (b) a strap system adapted to hold the cage in place over the pet's muzzle; and (c) a scavenger grille that can be attached and detached to the cage in the mouth opening thereof; (d) wherein, when the scavenger grille is attached to the cage in the mouth opening thereof, and the cage is held in place over the pet's muzzle, the pet is prevented from consuming undesired materials or objects, but when the scavenger grille is detached from the cage and removed, the pet can drink or eat through the mouth opening.

In a feature of this aspect, the scavenger grille includes a plurality of airflow openings therethrough.

In another feature of this aspect, a thickened mouth hole edge is provided around the mouth hole opening, and the scavenger grille includes one or more flange that couples to the mouth hole edge to hold the scavenger grille in place.

In a further feature, the one or more flange includes an upper snap flange and a lower snap flange, and wherein at least one of the upper snap flange and the lower snap flange clips or snaps into place in the mouth opening and is held in place with a semi-permanent friction fit.

In another feature of this aspect, the scavenger grille is manufactured of material that has a visible light transmittance percentage (VLT %) of at least 50%. In further features, the scavenger grille is manufactured of material that has a visible light transmittance percentage (VLT %) of at least 70%; the scavenger grille is manufactured of material that has a visible light transmittance percentage (VLT %) of at least 85%; the scavenger grille is made of the same material as the cage.

Broadly defined, the present invention according to one aspect relates to a pet muzzle, including: a muzzle body, including a cage adapted to fit over a pet's muzzle, having a closed distal end and an open proximal end; and a strap system adapted to hold the cage in place over the pet's muzzle; wherein the cage includes a topology-optimized structure which maximizes a material efficiency and a structural integrity while minimizing weight and bulk.

In a feature of this aspect, the cage includes one or more crumple zones that are strategically integrated into one or more specific impact-absorbing areas, and the crumple zones are configured to absorb and distribute impact forces unevenly to maintain structural integrity under a load. In a further feature, the crumple zones are adapted to restrict the ability of a pet to bite by deforming upon biting pressure, thereby preventing injury to the pet and damage to the pet muzzle.

In another feature of this aspect, the cage includes with one or more impact-absorbing elements to reduce the force of impact during a muzzle punch, thereby protecting a pet from harm if a muzzle punch is performed on the pet while wearing the pet muzzle.

In another feature of this aspect, the pet muzzle is manufactured from a thermoplastic polyurethane (TPU) copolymer material that combines the benefits of lightness and strength. In further features, the TPU copolymer material is impervious to water exposure, making it suitable for use in various weather conditions; the TPU copolymer material is impervious to UV exposure, ensuring long-lasting durability even in sunny conditions; the cage includes a transparent panel made from the TPU copolymer material to enhance visibility for both the pet and people in the vicinity thereof when the pet is wearing the pet muzzle; the transparent panel maintains optical clarity and does not distort the pet's vision; the TPU copolymer material is molded to provide a snug fit and a comfortable fit around a pet's snout, preventing chafing and discomfort, when the pet is wearing the pet muzzle; the snug fit is achieved through a combination of material flexibility and precise molding techniques; the cage includes airflow channels, integrated into the TPU copolymer material, to enhance pet comfort by facilitating airflow; the TPU copolymer material is manufactured using advanced 3D printing technology, allowing for intricate design and customization; the 3D printing of the TPU copolymer material creates a contoured design that precisely conforms to a pet's facial structure for a secure and comfortable fit when the pet is wearing the pet muzzle; the TPU copolymer material is eco-friendly and recyclable, promoting sustainability and responsible pet product design; and/or the TPU copolymer material is enhanced with antimicrobial properties, promoting hygiene and safety for pets.

In another feature of this aspect, the strap system is adjustable and includes at least one strap made from a durable, flexible material, allowing for secure fastening and comfortable wear. In a further feature, in the adjustable strap system has a quick-release mechanism for ease of use.

In another feature of this aspect, the cage includes a reinforced front section that is resilient to impact, abrasion, and wear.

In another feature of this aspect, the pet muzzle is designed to accommodate various pet sizes through a range of available sizes and adjustable features.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
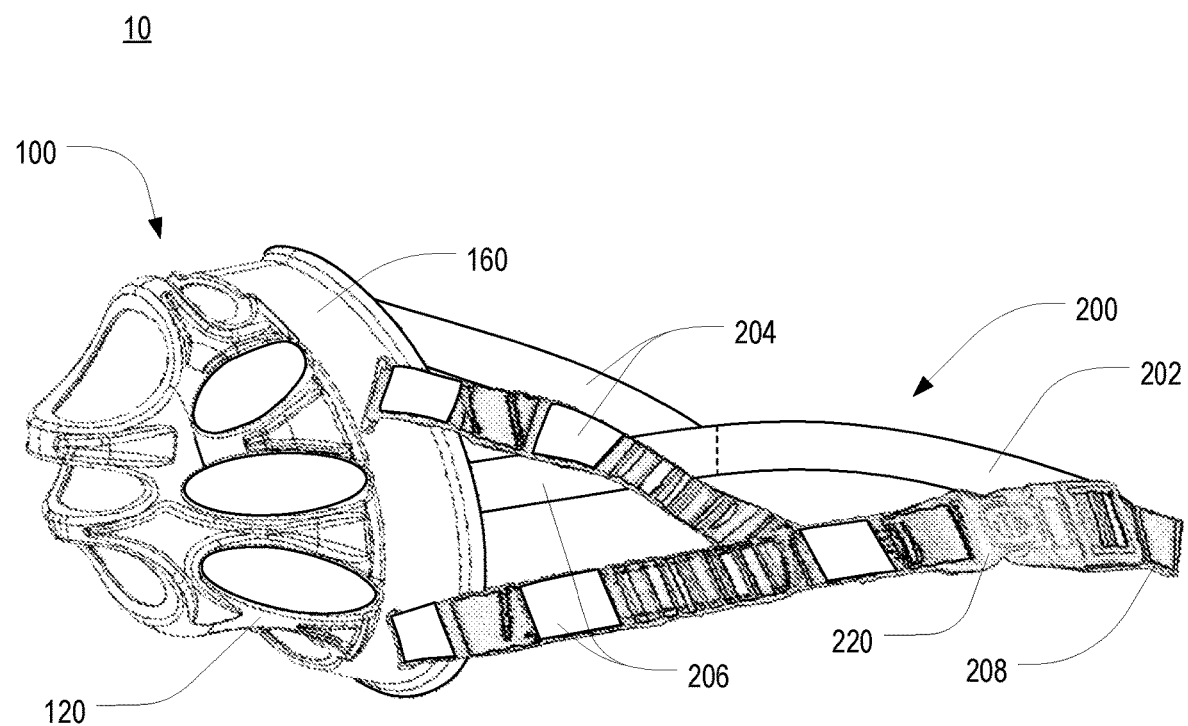
FIG. 1 is a side perspective view of a muzzle in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
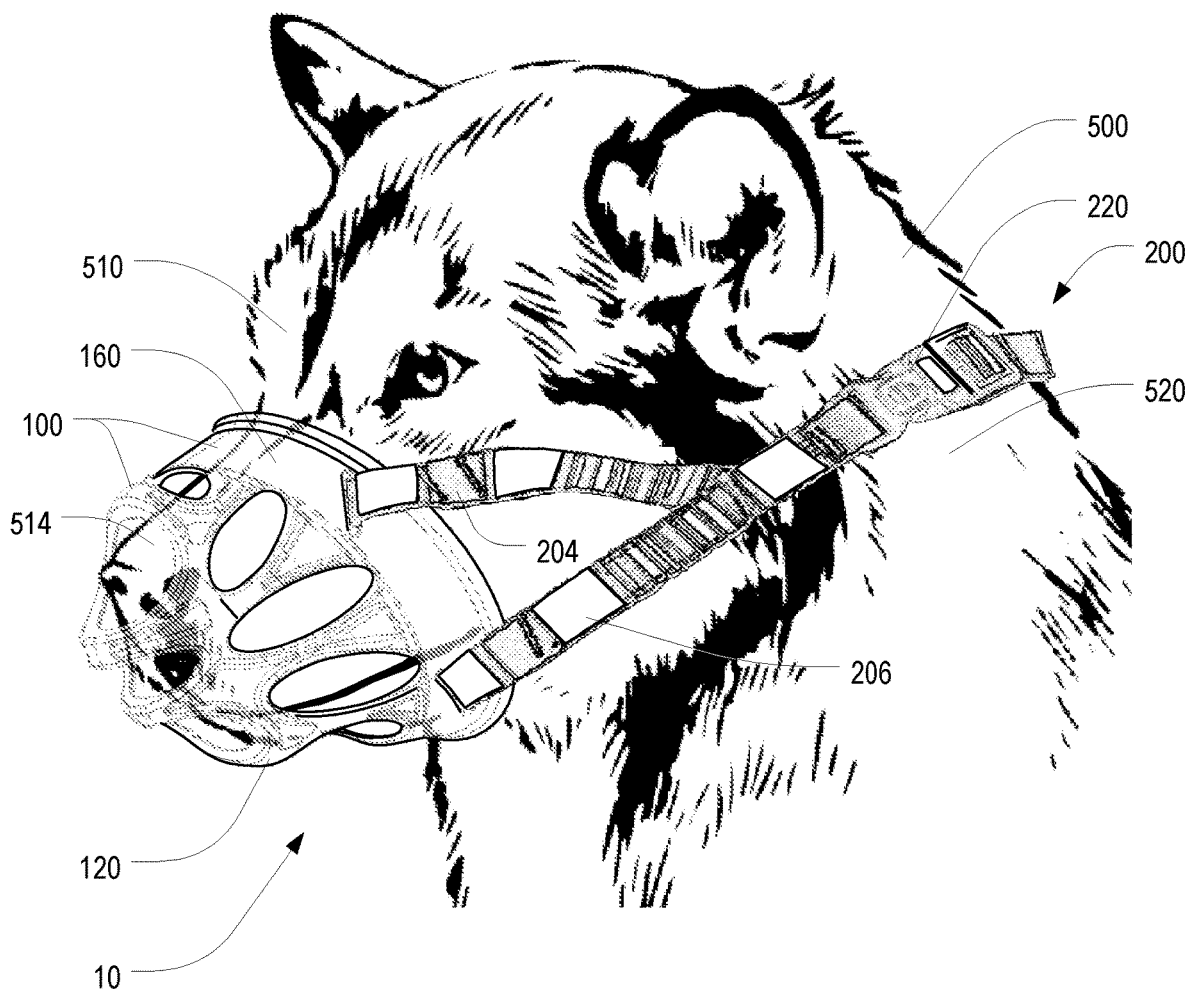
FIG. 2 is an illustration of a dog wearing the muzzle of FIG. 1.

FIG. 1 is a side perspective view of a muzzle 10 in accordance with one or more preferred embodiments of the present invention, and FIG. 2 is an illustration of a dog 500 wearing the muzzle 10 of FIG. 1. As shown therein, the muzzle 10 includes a muzzle body 100 and muzzle strap system 200. The muzzle body 100, which has a closed distal end and an open proximal end, includes a snout band 160 and a lattice cage 120. The snout band 160 encircles the dog's jaws and rests on, and is worn, on the top of dog's muzzle and/or face 510. The lattice cage 120 is carried on and supported by, the snout band 160, and is optimized to provide superior structural strength using light weight material. The strap system 200 includes two pairs (left and right) of side strap sections 204,206, a neck strap section 202, and a buckle 220. Each pair of side strap sections includes an upper strap section 204 and a lower strap section 206. Each of the four side strap sections is connected to the snout band 160 at a respective connection location, with the four connection locations being arranged, and evenly distributed, around the periphery of the snout band 160.

Figure 3:
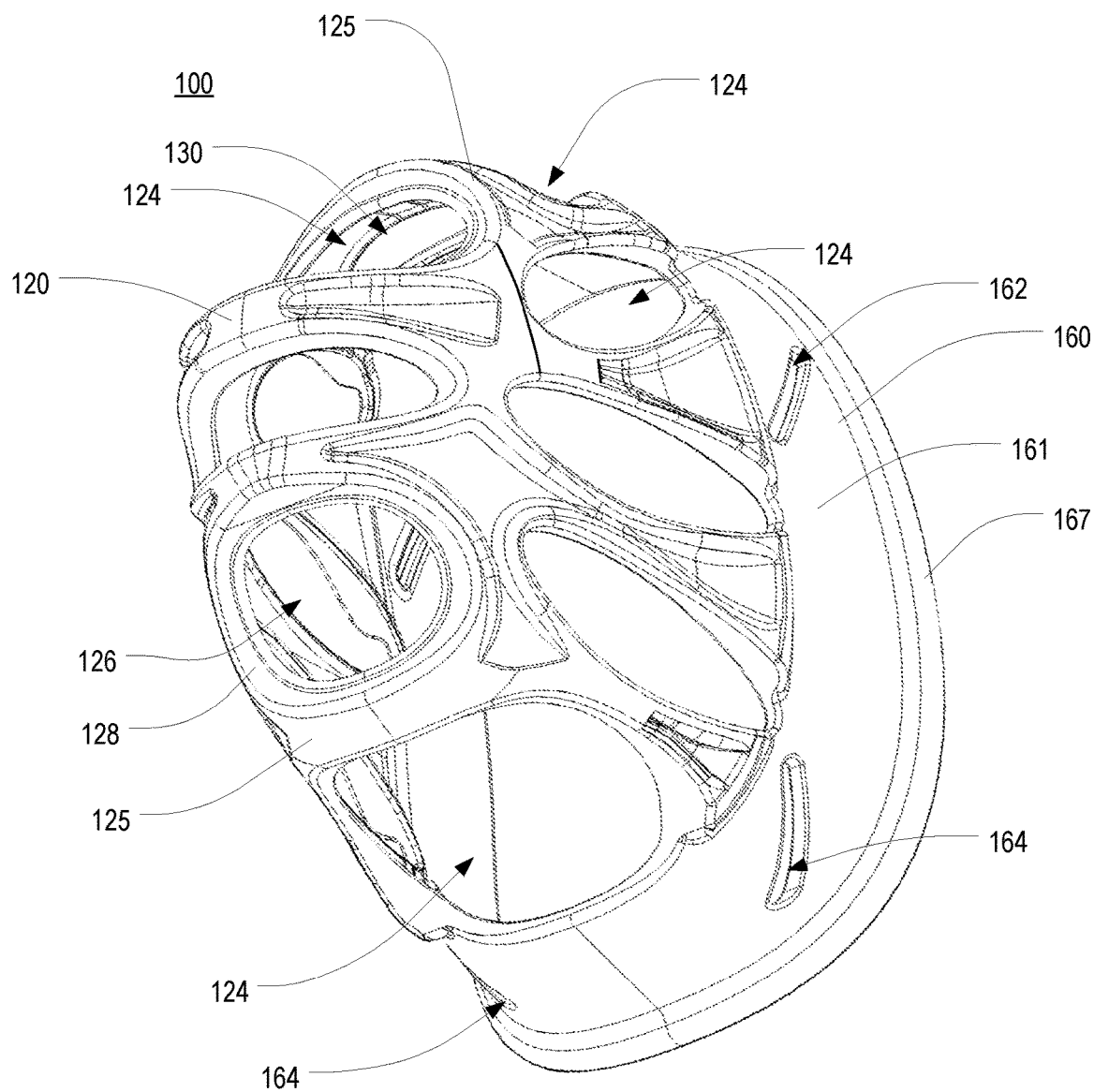
FIG. 3 is a bottom orthogonal view of the muzzle body of FIG. 1.
Figure 4:
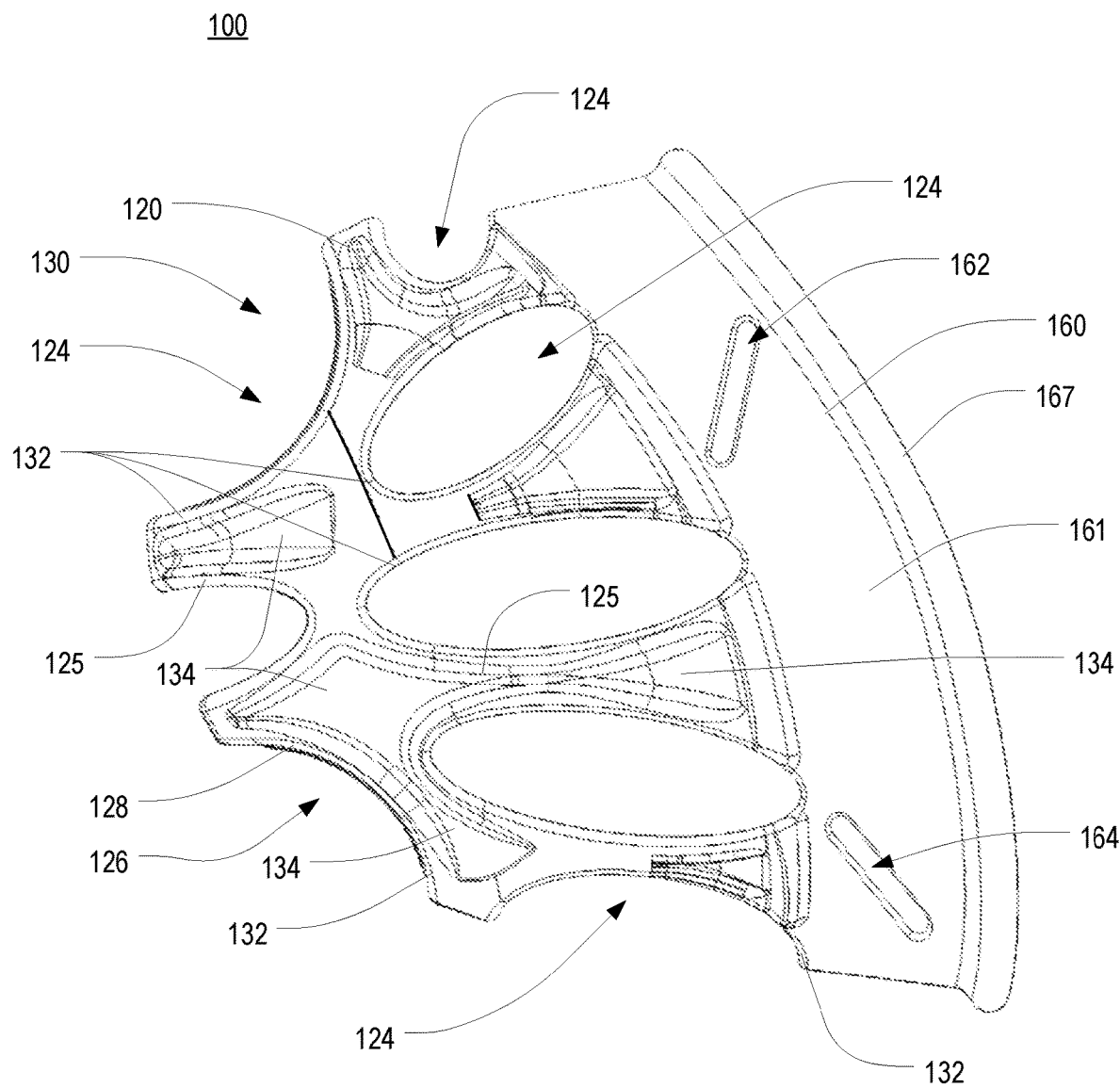
FIG. 4 is a right side view of the muzzle body of FIG. 1.
Figure 5:
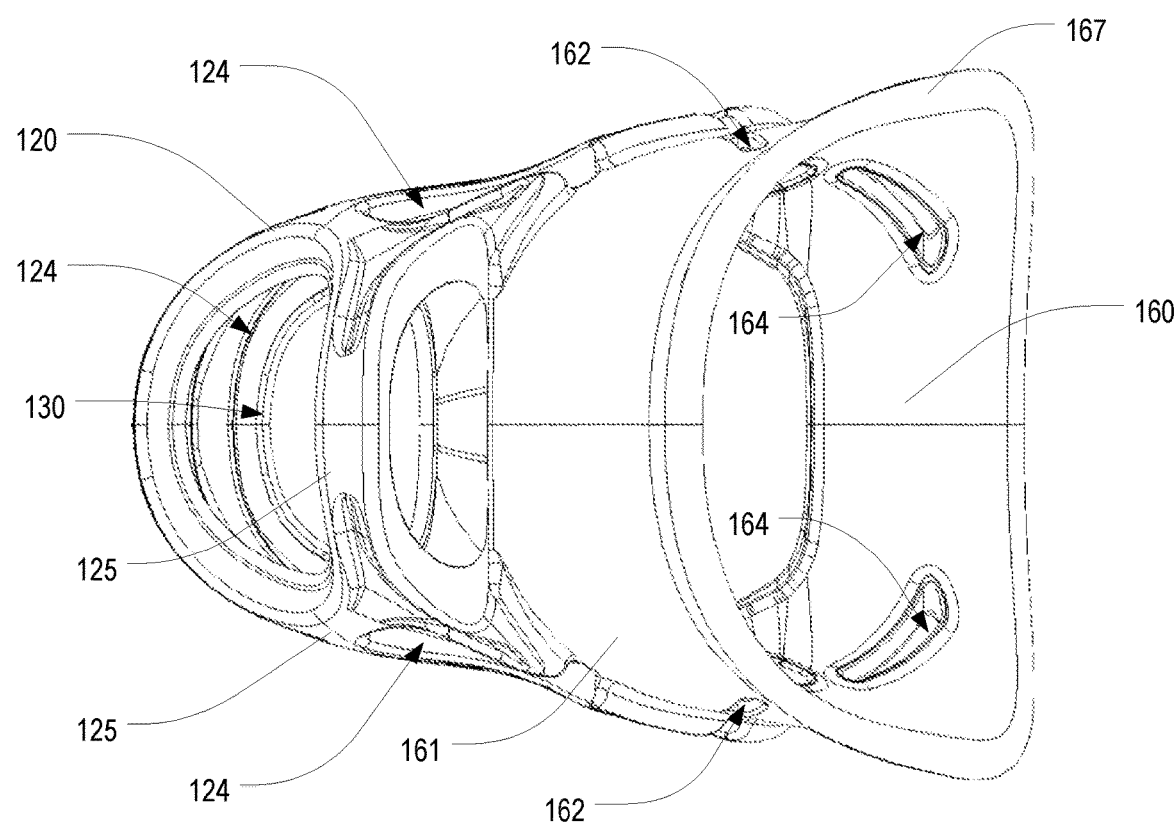
FIG. 5 is a top view of the muzzle body of FIG. 1.
Figure 6:
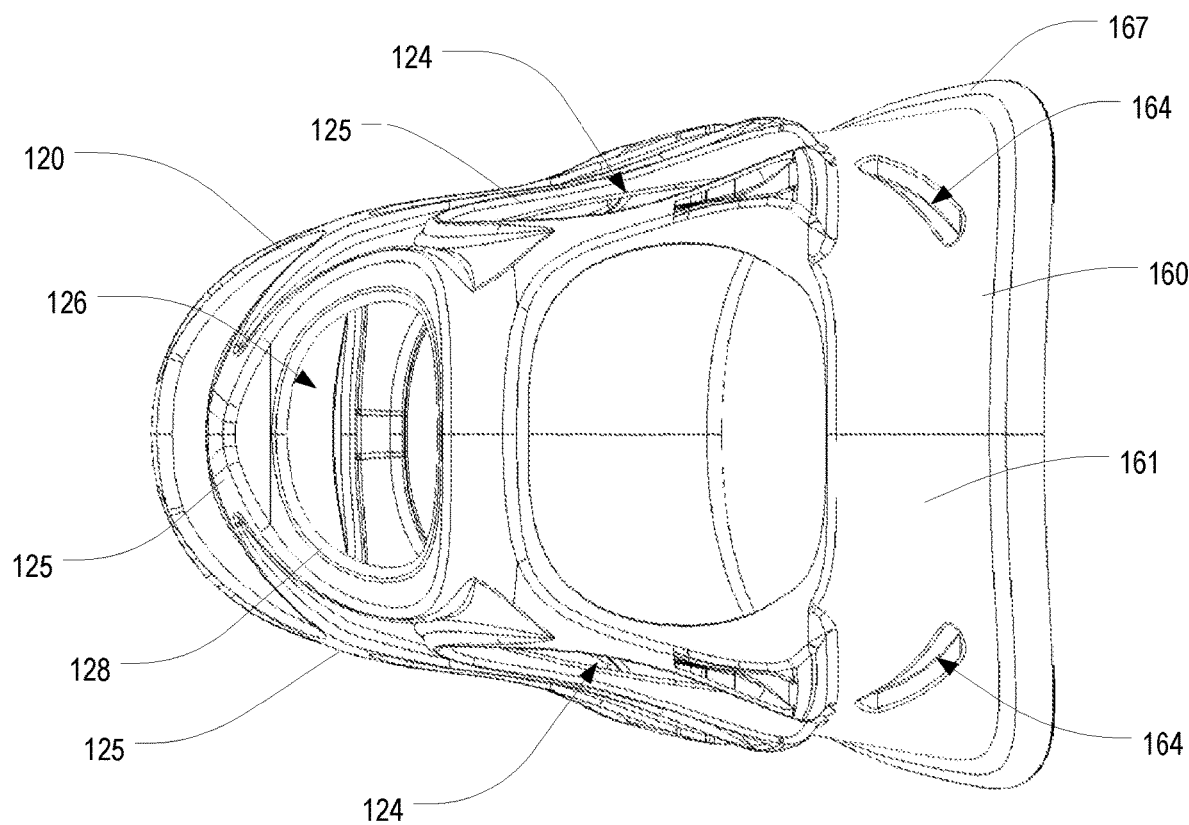
FIG. 6 is a bottom view of the muzzle body of FIG. 1.
Figure 7:
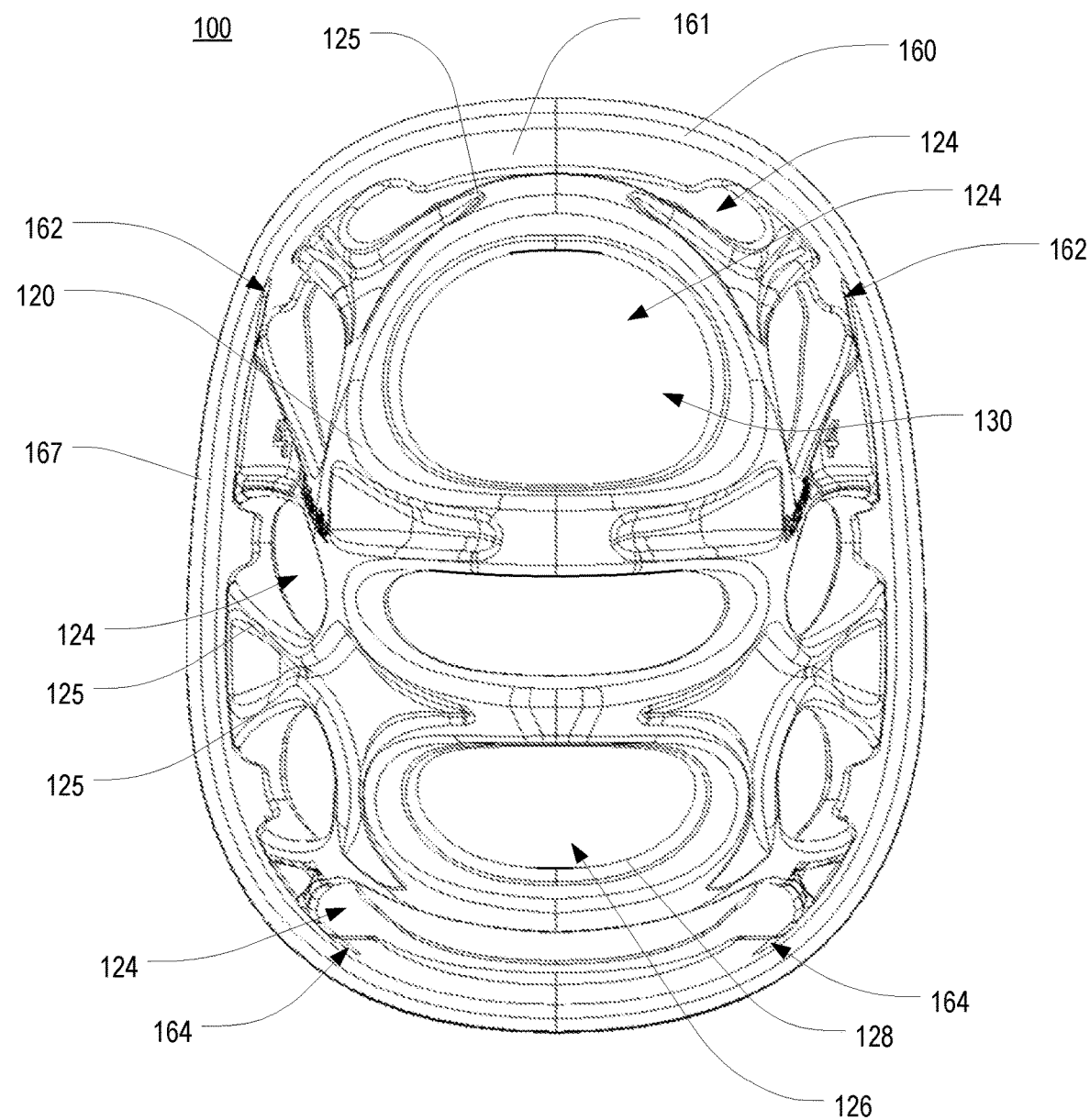
FIG. 7 is a front view of the muzzle body of FIG. 1.
Figure 8:
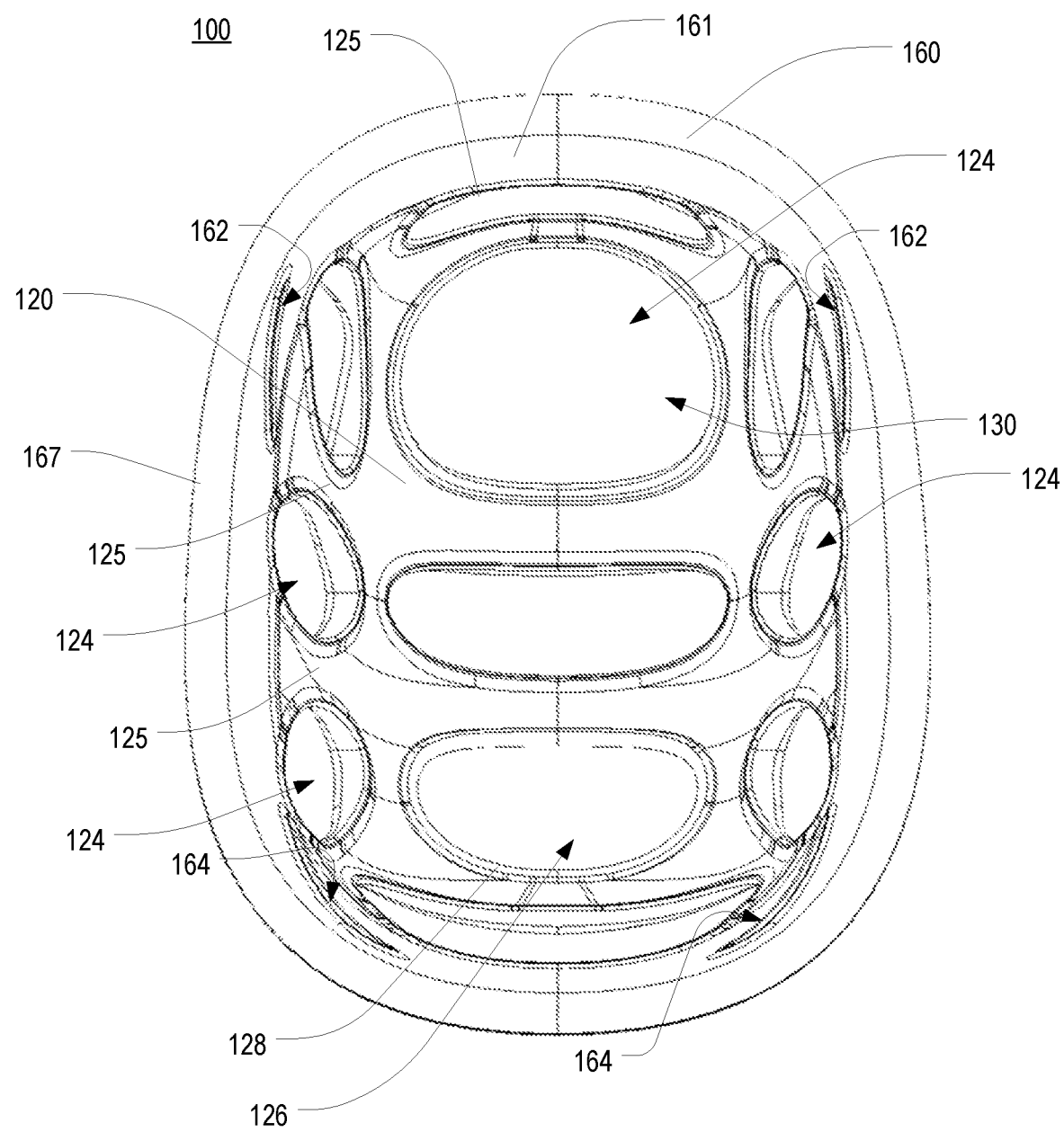
FIG. 8 is a rear view of the muzzle body of FIG. 1.

FIG. 3 is a bottom orthogonal view of the muzzle body of FIG. 1. In the illustrated embodiment, a respective slot penetrates the snout band 160 at each of the connection locations, with two of the slots being upper slots 162 and two of the slots being lower slots 164, with each upper side strap section 204 being routed through a respective upper slot 162 and each lower side strap section 206 being routed through a respective lower slot 164. However, connections between the strap system 200 and the muzzle body 100 may be achieved in other ways as well. In the illustrated embodiment, the distal ends of the side strap sections 204,206 are doubled back and semi-permanently attached to themselves, such as by sewing. However, other means for permanent or semi-permanent attachment may be utilized, or buckles may be provided for one or more of the side strap sections 204,206 so as to provide removability and adjustability. The neck strap section 202 extends around the back of the dog's neck 520 so as to hold the muzzle body 100 on the dog's face 510.

In the illustrated embodiment, the neck strap section 202 includes two strap portions, each comprising a length of fabric strapping, webbing, or the like, and male and female parts of a compatible interconnecting lockable quick release buckle 220 respectively disposed at free ends of the two strap portions. However, other strap arrangements may be used instead. The buckle 220 is disposed in an intermediate portion of the neck strap section and provides both removability (by disconnecting male and female portions of the buckle 220) and adjustability (by tightening or loosening the neck strap section 202), but in some embodiments a buckle may be omitted, while in other embodiments, removability and adjustability are provided by separate components. Once connected, they form a continuous loop strap system 200 from the muzzle body 100 on its lateral side to its medial by passing around the back of neck 520. One or both sides of the buckle 220 permit the strap system 200 length to be increased or decreased to produce a variable fit on differing neck 520 proportions. Also, in some embodiments, fit may be enhanced through the use of strap portions that include properties of elasticity.

The neck strap section 202 may be fitted with a loop or other element to facilitate connection to a dog collar in order to help keep the neck strap section 208, and thus the muzzle 10, in place on the dog's neck. In one such embodiment, a figure eight/double loop of material is formed from fabric strapping, webbing, or the like, with a portion of the neck strap section 202 being routed through one loop and the dog's collar being routed through the other loop. One or both loops are free to slide, along the neck strap section or the collar respectively, thus forming a free-moving fixation point between the neck strap section 202 and the collar (not shown).

The muzzle body 100 is shown in greater detail in FIGS. 4-8, which are a right side, top, bottom, front, and rear view, respectively, of the muzzle 10 of FIG. 1. As described above, the muzzle body 100 includes a lattice cage 120 supported by a snout band 160. The snout band 160 includes a snout band bridge 161, snout band trim 167, the top strap slots 162, and the bottom strap slots 164. In at least some embodiments, the snout band bridge 161 is the main structural element of the snout band 160, and the top and bottom straps slots 162,164 are located there. The snout band trim 167 is arranged around the edge of the snout band 160, particularly including the snout band bridge 161. The snout band trim 167 is a shaped feature that rests up and against the dog face 510 and is of a rounded shape to prevent rubbing and chaffing by the muzzle 10 when worn by a dog 500.

The lattice cage 120 is primarily comprised of a plurality of struts 125 defining a plurality of lattice cage openings 124. Preferably, the openings themselves are relatively large, and the overall proportion of open area-to-strut area is likewise relatively large, so as to facilitate airflow through the cage 120 and thereby allow the dog to breathe easily. The openings 124 also make it possible to see portions of a dog's facial expressions, but in at least some embodiments, the lattice cage 120 is made with a transparent material so anyone in the vicinity of a dog 500 can see all or nearly all of the facial expressions of the dog 500 while the dog is wearing the muzzle 10. In at least some embodiments, one of the openings 130 serves as a nose opening 126. In at least some embodiments, one of the openings 124 serves as a mouth opening 126. The mouth opening 126 is the opening 124 located on the underside of muzzle body 100 which allows a dog 500 to drink or even eat treats while wearing the muzzle 10. In at least some embodiments, the mouth opening 126 has a mouth opening edge 128 which enables a scavenger grille 400 to be installed on or in the lattice cage 120 of the muzzle 10 as further described hereinbelow.

In the illustrated embodiment, the mouth and nose openings 126,130 are large elliptical or oval openings, one elliptical or oval opening is arranged in between the mouth opening 126 and the nose opening 130 at the distal end of the cage 120, three elliptical or nearly-elliptical openings are arranged on each of the left and right sides of the cage 120, one elliptical or oval opening is arranged along the top of the cage 120, and one large elliptical or oval opening is arranged along the bottom of the cage 120, with all of the openings being separated from one another by narrow struts 125. In various embodiments, zero to two elliptical or oval openings are arranged in between the mouth opening 126 and the nose opening 130 at the distal end of the cage 120, two to six oval or elliptical openings are arranged on each of the left and right sides of the cage 120, zero to two elliptical or oval openings are arranged along the top of the cage 120, and one to four elliptical or oval openings are arranged along the bottom of the cage 120.

In preferred embodiments, the arrangement of openings 124 and struts 125 is optimized using computerized mathematical methodology to maximize airflow and structural performance while minimizing material requirements. The unique elliptical shapes and sizes of the various openings 124 in the illustrated embodiments is a function of such optimization, and the approach is believed to be an improvement over existing muzzle cage designs. However, considerable improvement may also be accomplished using generally oval openings or in some cases some other related shapes. At the same time, the struts 125 have thickened portions 132 around the edges of the openings 124 and thinner portions 134 in other areas, thereby enhancing structural performance while reducing material requirements. In at least some of the embodiments, the thicker portions 132 and thinner portions 134 are arranged to define airflow channels to enhance pet comfort.

Figure 9A:
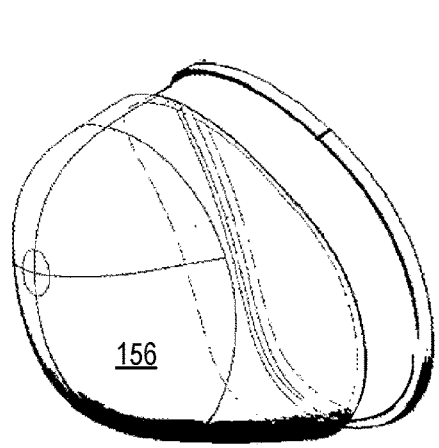
FIGS. 9A-9C are representations of various stages of modeling and development of the lattice cage of FIG. 1.
Figure 9B:
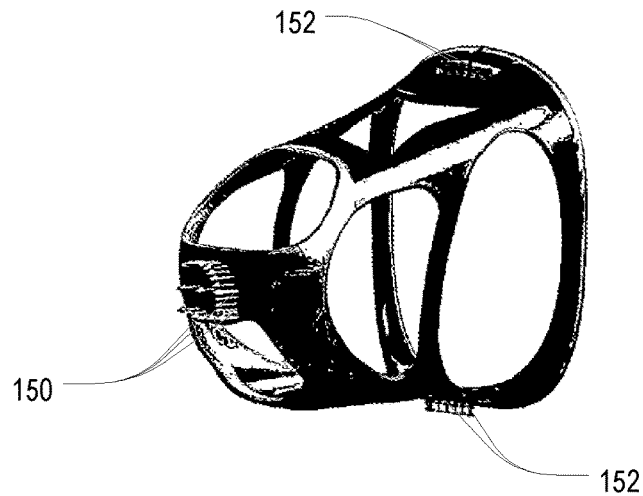
Figure 9C:
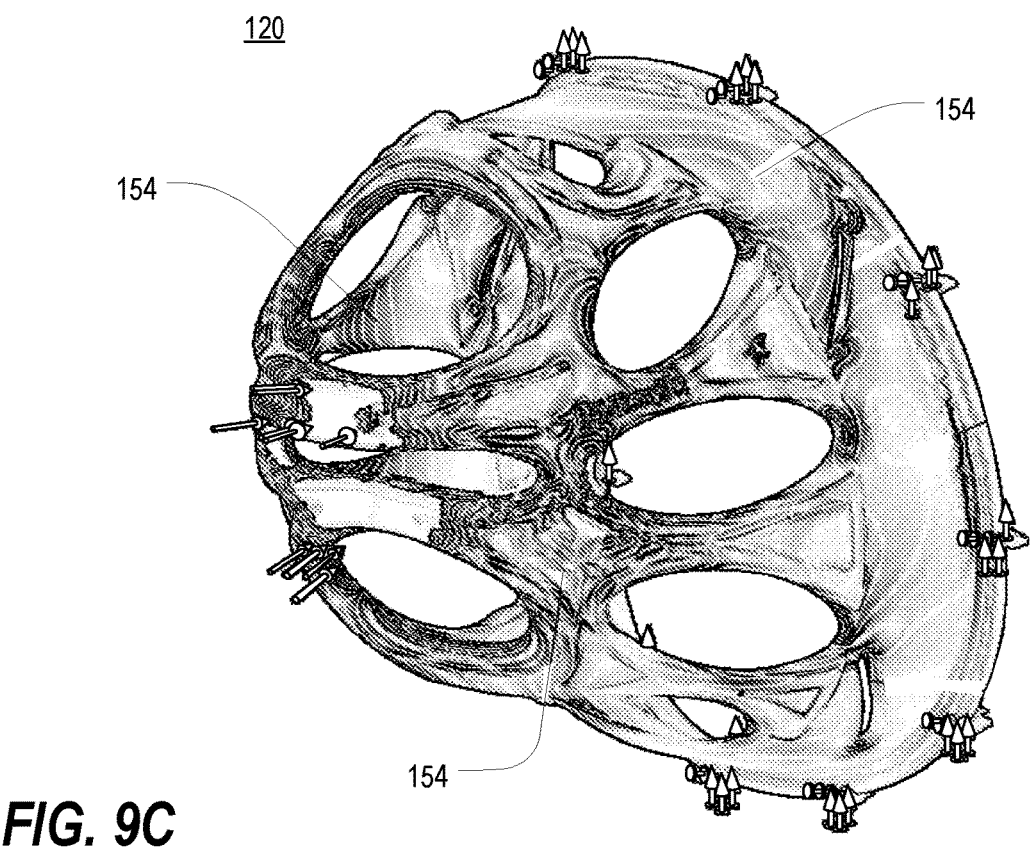

The particular shapes of ovals and struts used in the illustrated embodiments were developed as illustrated in FIGS. 9A-9C, which are representations of various stages of modeling and development of the lattice cage 120 of FIG. 1. As shown in FIG. 9A, a boundary area 156 is defined as the original material area shape to be optimized. Next, as shown in FIG. 9B, computerized topology rough modeling is carried out of the most efficient structure and design of boundary area 156 given data variables of material composition and properties (such as elastic modulus, shear modulus, material mass density, tensile strength, compressive strength, yield strength, thermal conductivity) together with forces and loads applied on load points 150 and fixed points 152. FIG. 9C shows the final rendered topology optimized structure of muzzle body 100 showing Von Mises stress lines 154. (Von Mises stress lines 154 are used by the computerized mathematical method to predict yielding of material under complex loading from the results of uniaxial tensile scenarios for topology optimization.) The Von Mises stress lines 154 generated via computerized topology optimization rendering, outline the shape and locations of the struts for the most efficient design of the lattice cage 120.

In at least some embodiments, the topology optimized structure of the muzzle body 100 includes crumple zones that are strategically integrated into specific impact-absorbing areas. Such crumple zones may be configured to absorb and distribute impact forces unevenly so as to maintain structure integrity under load. The crumple zones may also restrict the ability of a pet 500 to bite by deforming under biting pressure, thereby preventing injury to the pet 500 and damage to the muzzle body 100.

In at least some embodiments, the topology optimized structure of the muzzle body 100 includes impact-absorbing elements to reduce the force of impact during a muzzle punch.

In at least some embodiments, the topology optimized structure of the muzzle body 100 features a contoured design that precisely conforms to the pet's facial structure for a secure and comfortable fit.

In at least some embodiments, the topology optimized structure of the muzzle body 100 includes a reinforced front section that is resilient to impact, abrasion, and wear.

In at least some embodiments, the snout band 160 and lattice cage 120 are manufactured as one injection molded part. To accomplish this, a single core for an injection mold may be used where all elements of the snout band 160 and lattice cage 120 are in fluid communication with each other, so that the material injected into the injection mold flows to all void areas of the mold, thus creating a single integral part with each production cycle of the injection mold machine. In at least some embodiments, the material is a thermoplastic rubber (TPR). The resulting muzzle body 100 may be heat-shaped by a user to fit the unique size and shape of a particular dog 500. More particularly, a muzzle body 100 of such material may be heated slightly by applying hot tap water to it, reshaping it by hand, and allowing it to cool once again. However, other materials may be used in some embodiments.

In at least some embodiments, the material is a thermoplastic polyurethane (TPU). In at least some TPU embodiments, the muzzle is manufactured from a TPU copolymer material that combines the benefits of lightness and strength. In at least some TPU embodiments, the TPU copolymer material is impervious to water exposure, making it suitable for use in various weather conditions. In at least some TPU embodiments, the TPU copolymer material is impervious to UV exposure, ensuring long-lasting durability even in sunny conditions. In at least some TPU embodiments, the muzzle body includes a transparent panel made from the TPU copolymer material to enhance visibility for both the pet 500 and people in the vicinity thereof. In at least some TPU embodiments, the transparent panel maintains optical clarity and does not distort the pet's vision. In at least some TPU embodiments, the TPU copolymer material is molded to provide a snug and comfortable fit around the pet's snout 514, preventing chafing and discomfort. In at least some TPU embodiments, the TPU copolymer material is eco-friendly and recyclable, promoting sustainability and responsible pet product design. In at least some TPU embodiments, the TPU copolymer material is enhanced with antimicrobial properties, promoting hygiene and safety for pets.

Figure 10:
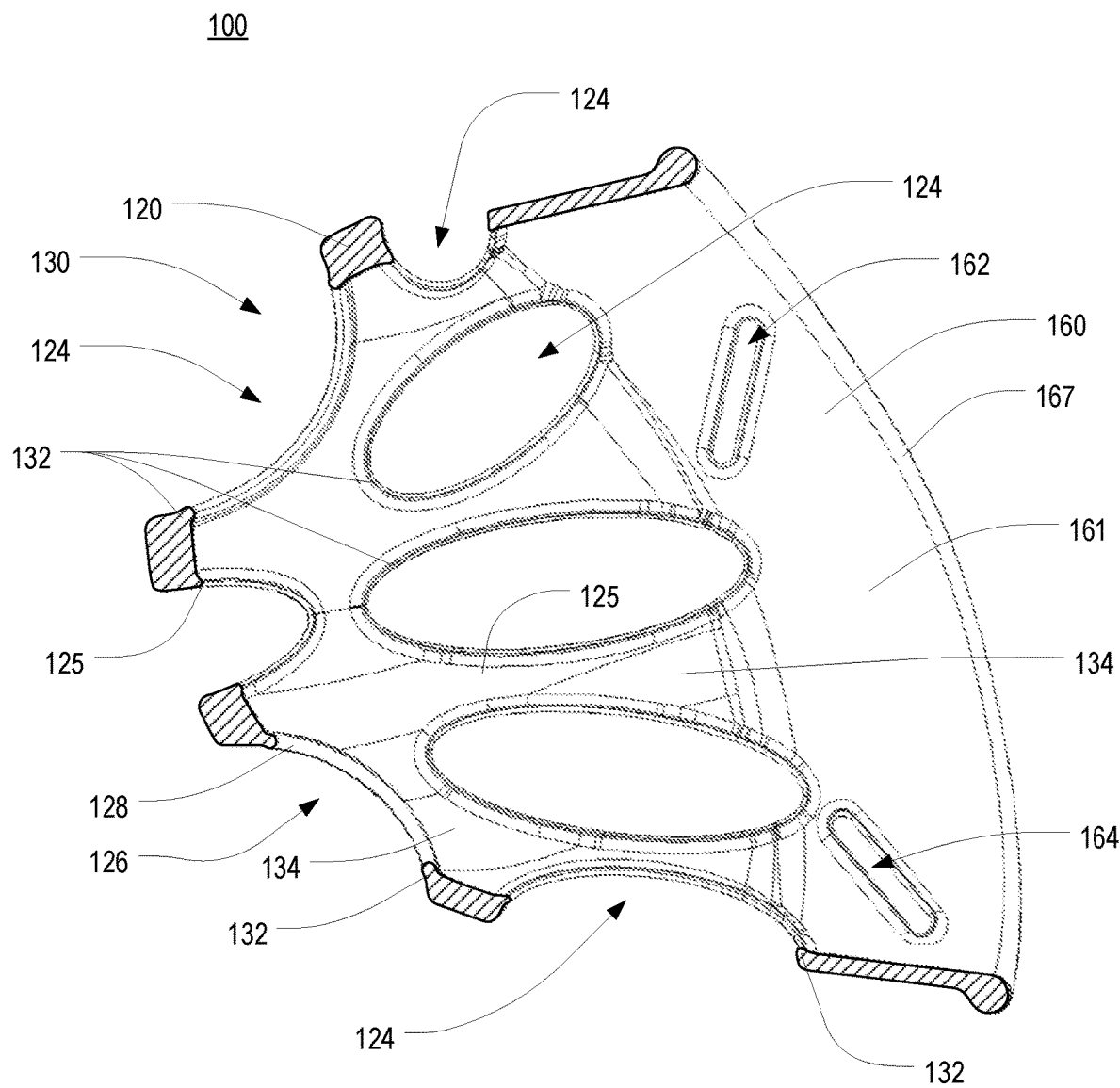
FIG. 10 is a right side cross-sectional view of the muzzle body of FIG. 1.
Figure 18:
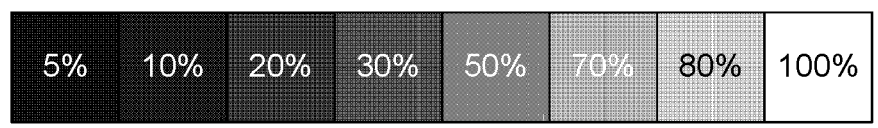
FIG. 18 is a graphical illustration of various VTL % values.

FIG. 10 is a right side cross-sectional view of the muzzle body 100 of FIG. 1. The material used for the snout band bridge 161, struts 125, and other portions of the muzzle body is transparent with a Visible Light Transmittance Percentage (VLT %) that is at least 5% and preferably at least 50%, more preferably at least 70%, and most preferably at least 85%. In this regard, FIG. 18 is a graphical illustration of various VTL % values. A 95% VLT % would provide a higher level of light transmission and translucency, while a lower VLT % such as 5% would render a lattice cage 120 that is opaque. Light from a light source (i.e., the sun, a light bulb, or the like) generates light waves that pass through the transparent lattice cage 120. Some of the light is absorbed by the dog, while other light waves, less in brightness, are reflected by the dog 500 through the lattice cage 120, where they are visible to those in the vicinity of the dog 500. This, together with the openings in the cage 120, allows people in the vicinity of the muzzle-wearing dog 500 to view the dog's facial expressions and features through the lattice cage 120.

The Visible Light Transmittance Percentage Chart illustrates the VLT % transparent range that muzzle body 100 can be, with a Visible Light Transmittance Percentage (VLT %) of between 95% and 5%. A 95% VLT % would provide a higher level of light transmission and translucency, while a lower VLT % such as 5% would render a lattice cage 120 that is opaque. Manufacturing the lattice cage 120, from a material with a high VLT % allows user 550 to view dog 500 facial expressions and features of dog face 510, such as dog lips 516 and dog snout 514. Observing and viewing the movement of the facial expressions and features of dog face 518, such as dog lips 516 and dog snout 514 are important indicators of the dog's emotional state, such as their anxiety level or likely warning or signaling of dog's intention to launch an aggressive attack. In addition, those in the vicinity of the dog 500 may also observe and gain information regarding dog's health. The color or the change of color of dog snout 514 may be accompanied by health complications, such as vitiligo, lupus, bacterial infection, or skin cancer. Thus, the transparent lattice cage 120 provides the added benefit of making it possible to evaluate the health of dog 500.

Figure 11:
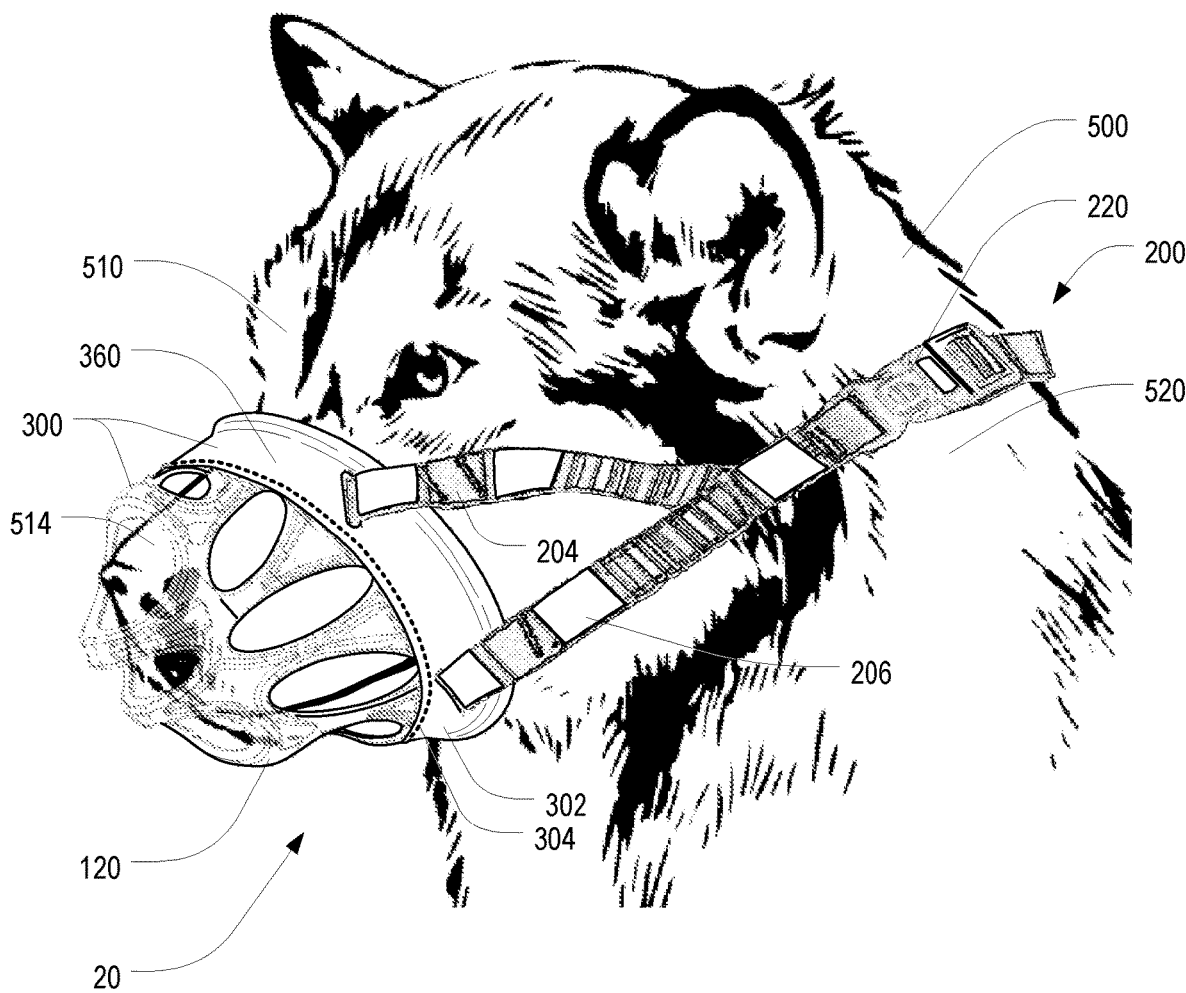
FIG. 11 is a side perspective view of another muzzle in accordance with one or more preferred embodiments of the present invention.

If desired, additional comfort may be provided through the use of a band cover. In this regard, FIG. 11 is a side perspective view of another muzzle 20 in accordance with one or more preferred embodiments of the present invention. As shown therein, a muzzle 20 includes a muzzle body 300 and a muzzle strap system 200. The muzzle strap system 200 shown therein is similar to that of FIG. 1, and as with the muzzle body 100 of FIG. 1, the muzzle body 300 of FIG. 11 includes a snout band 360 and a lattice cage 120. However, the snout band 360 of FIG. 11 further includes a fabric band cover 302 wrapped around the snout band bridge 161. In various embodiments, the band cover 302 can be made of a flexible material such as foam, fabric, cloth, vinyl, neoprene or leather and the like. In various embodiments, the band cover 302 can be attached to snout band 360 by various methods including adhesive, snaps, Velcro or sewn with stitching 304. In some embodiments, the snout band cover 302 can be an antimicrobial fabric to fend off microorganisms, reduce odors and help prolong the usable life of band cover 302. In FIG. 11, the band cover 302 is made of a fabric attached to snout band 360 by stitching 304. In such embodiment, the snout band trim 167 may be used as a parallel sewing guide to enable the installation of a band cover 302 with sewing machine stitching 304 during manufacture.

Figure 12:
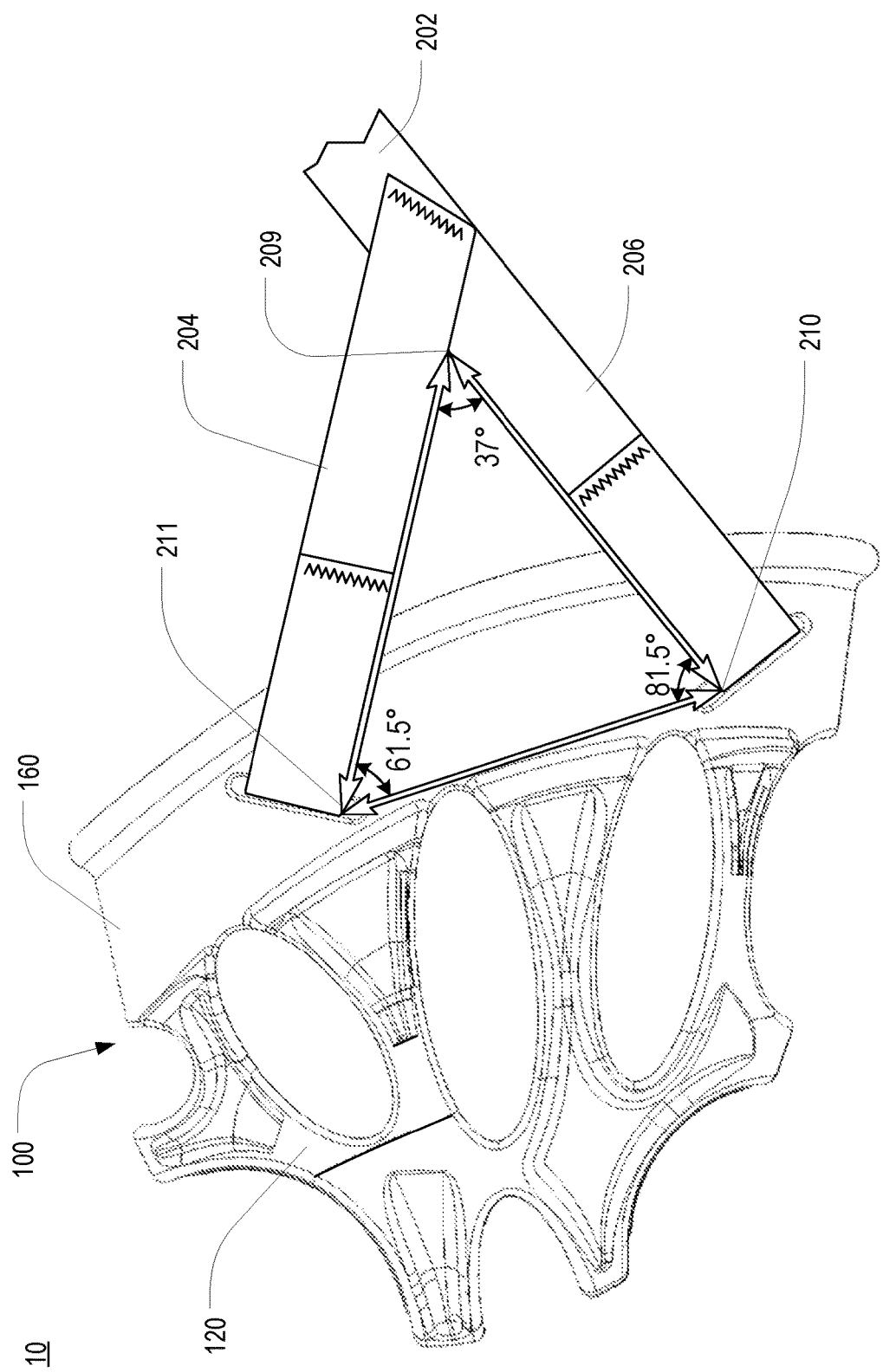
FIG. 12 is a side view of the muzzle of FIG. 1.

In the muzzles shown and described herein, the muzzle body is held in position on the dog 500 by means of the strap system 200. In the embodiments of FIGS. 2 and 11, the neck strap section 202 is secured around neck 520 by use of buckle 220. The neck strap section 202 extends from the vertex of the upper and lower strap sections 204,206 on the left side of the dog's face 510 to the vertex of the upper and lower strap sections 204,206 on the right side. When positioned and tightened appropriately, the neck strap section 202 pulls both pairs of upper and lower strap sections 204,206 rearward. The relative positions and orientations of the strap sections are shown in FIG. 12, which is a side view of the muzzle of FIG. 1. The strap system 200 is attached to the muzzle body 100 at four fixed points equally situated on the circumference of the snout band 160 at the two upper slots 162 and the two lower slots 164. Each upper side strap section 204 intersects with its corresponding lower side strap section 206 at a first vertex point 209, the lower side strap section 206 being the initial side of first vertex point 209 and upper side strap section 204 being the terminal side of first vertex point 209. The interior angle at the first vertex point 209 is preferably between 32 and 42 degrees, more preferably between 35 and 39 degrees, and most preferably about 37 degrees.

Figure 13:
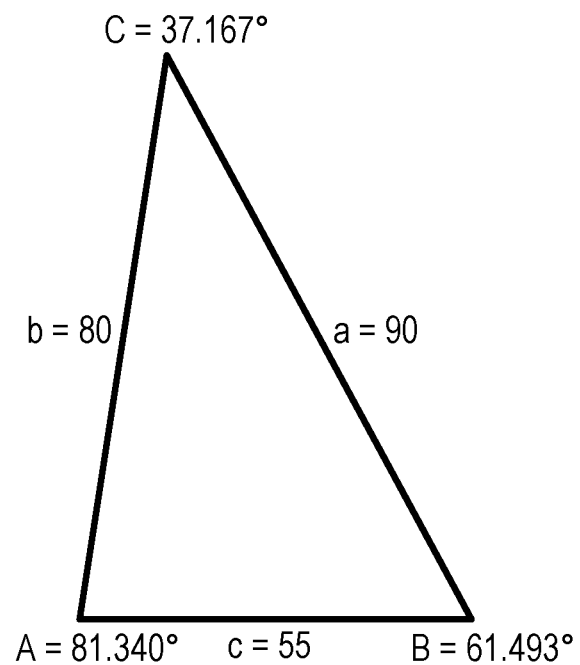
FIG. 13 is a graphical illustration of the triangle formed by the upper and lower straps of FIG. 12 and its angles.

Two additional vertex points 210,211 may be established using a line segment defined between the top of each lower slot 164 to the bottom of the corresponding upper slot. This line segment intersects the lower side strap section 206 at a second vertex point 210, and intersects the upper side strap section 204 at a third vertex point 211. The interior angle at second vertex point 210 (between the defined line segment and the lower side strap section 206) is preferably between 76 and 86 degrees, more preferably between 79 and 83 degrees, and most preferably about 81 degrees as shown in FIG. 12, while the interior angle at the third vertex point 211 (between the defined line segment and the upper side strap section 204) is preferably between 57 and 67 degrees, more preferably between 60 degrees and 64 degrees, and most preferably about 62 degrees. The geometry of the three sides (and their three interior angles) forms an acute scalene triangle as shown in FIG. 12 and FIG. 13, wherein FIG. 13 is a graphical illustration of the triangle formed by the upper and lower straps 204,206 of FIG. 12 and its angles.

Although significant advantages are afforded by the use of a muzzle body that includes a lattice cage supported by a snout band, like the muzzle bodies 100,300 shown herein, the principles of the strap system 200 may likewise be applied to muzzle bodies in other forms, including those that utilize a rigid or semi-rigid cage but no distinct snout band. Pairs of upper and lower side strap sections, each pair meeting at a respective vertex on one side of the dog or the other as described herein, may be coupled to the open proximal end of a cage of any of a variety of types without departing from the scope of the present invention.

In at least some commercial embodiments, muzzles 10,20 according to the present invention are provided in different sizes. The different sizes, especially in combination with various adjustable features, accommodate various pet sizes.

Figure 14:
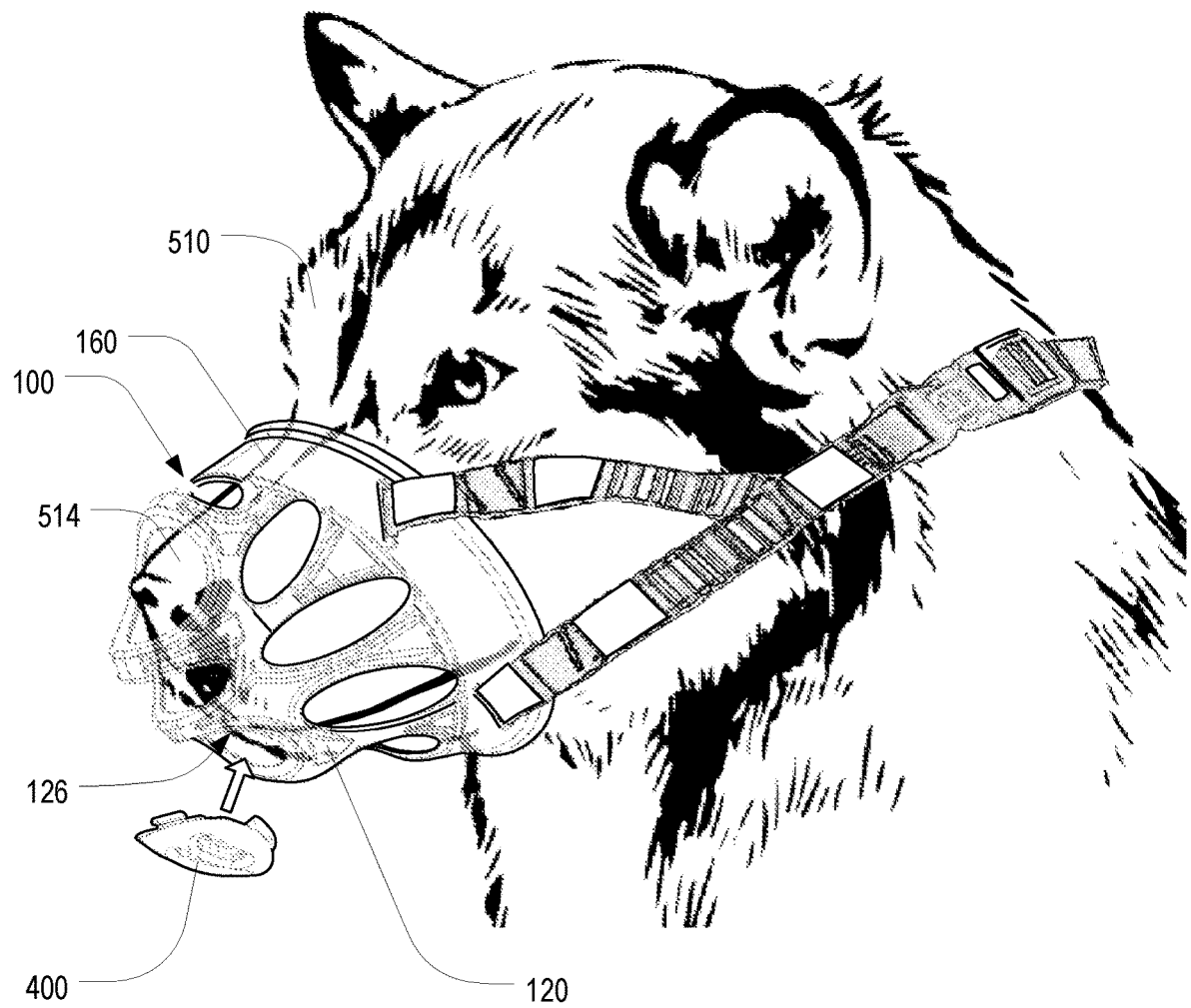
FIG. 14 is a side perspective view of the muzzle of FIG. 1 illustrating a scavenger grille being installed therein in accordance with one or more preferred embodiments of the present invention.
Figure 15:
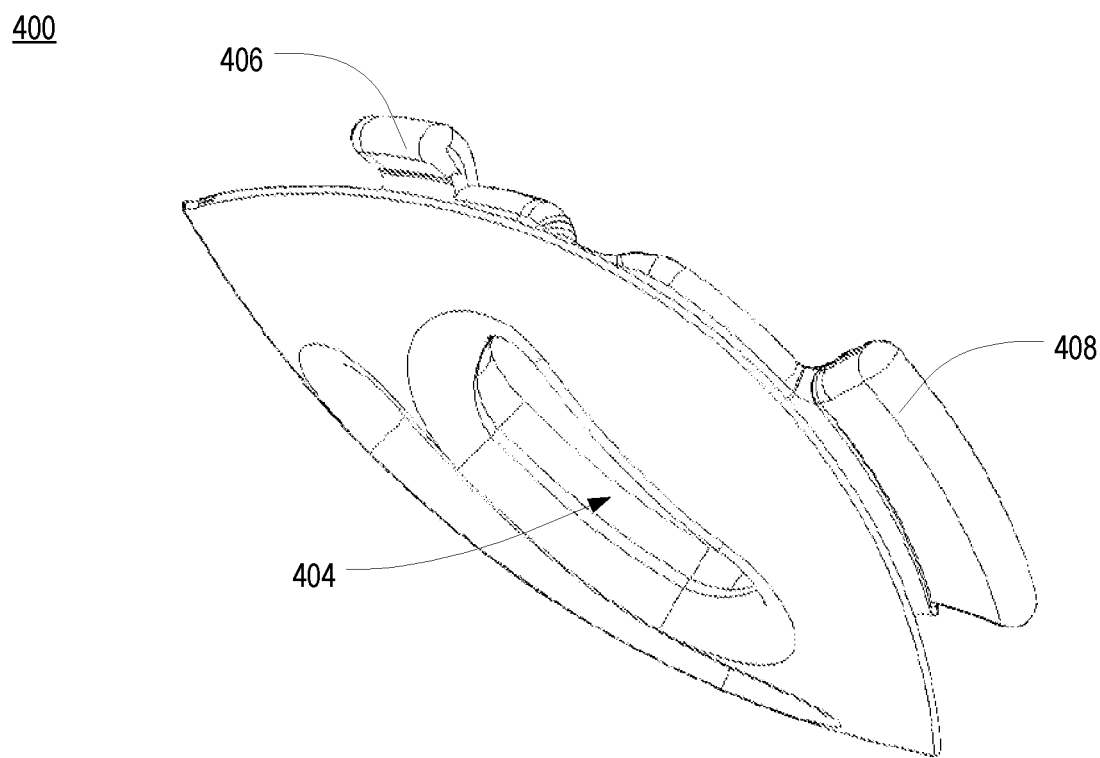
FIG. 15 is a side view of the scavenger grille of FIG. 14.
Figure 16:
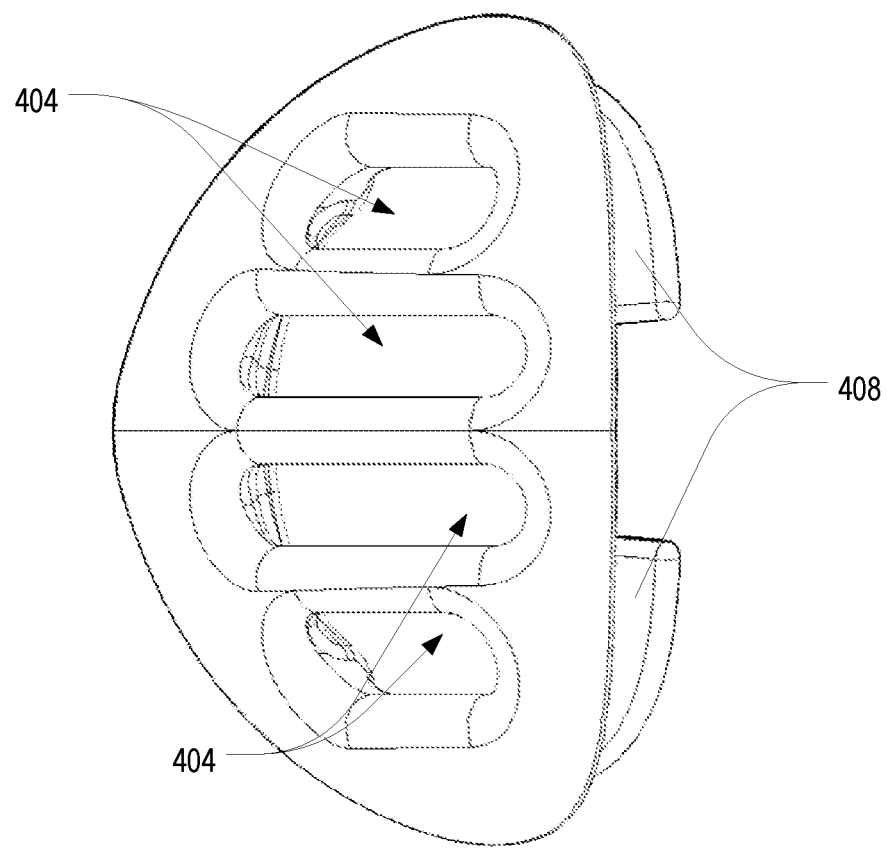
FIG. 16 is a front view of the scavenger grille of FIG. 14.
Figure 17:
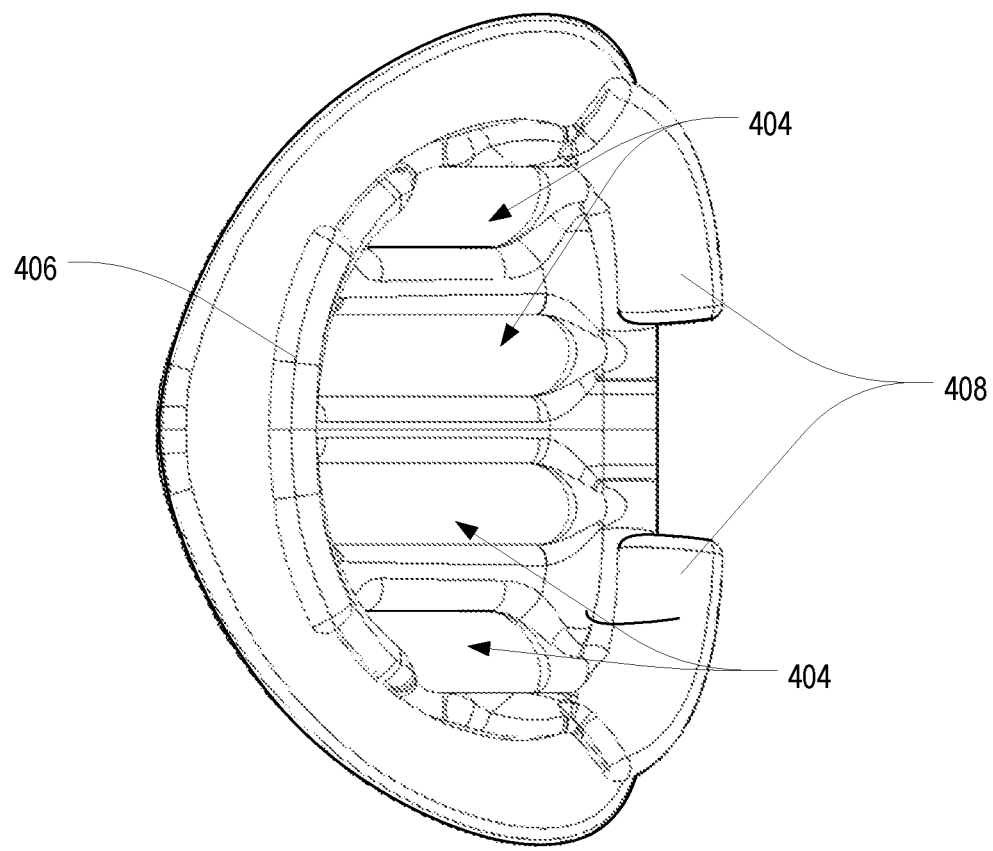
FIG. 17 is a rear view of the scavenger grille of FIG. 14.

Although the mouth opening 126 makes it possible for the dog 500 to drink or even eat while wearing the muzzle 10,20, there are situations where it would be preferable to prevent the dog 500 from eating or even drinking. In this regard, FIG. 14 is a side perspective view of the muzzle 10 of FIG. 1 illustrating a scavenger grille 400 being installed therein in accordance with one or more preferred embodiments of the present invention. The scavenger grille 400 is shown in greater detail in FIGS. 15-17, which are a bottom front, rear, and side view, respectively, of the scavenger grille 400 of FIG. 14. The scavenger grille 400 includes holes 404, an upper snap flange 406, and a lower snap flange 408.

As shown in FIG. 14, a scavenger grille 400 can be attached to, and detached and from, the muzzle body 100 by clipping or snapping the grille 400 into the lattice cage 120, or otherwise coupling the grille 400 to the lattice cage 120, at the location of the mouth hole 126. In the illustrated embodiment, the scavenger grille 400 is attached by snapping the upper snap flange 406 and the lower snap flanges 408 onto the mouth hole edge 128 with a semi-permanent friction fit, but it will be appreciated that other coupling elements and mechanisms may be utilized. The scavenger grille 400 can then be removed from the lattice cage 120 by unsnapping the semi-permanent friction fit or otherwise decoupling or detaching the grille 400 from the cage 120. A dog owner or the like may, for example, choose to install the scavenger grille 400 onto the lattice cage 120 so as to prevent dog 500 from consuming undesired materials or objects while wearing the muzzle 10. In at least some embodiments, the grille 400 includes holes 404 that facilitate air flow therethrough as well as providing additional bite protection from dog 500.

In at least some embodiments, the scavenger grille 400 is made of the same material as the cage 120. In at least some embodiments, the scavenger grille 400 is made of TPR. Also, in at least some embodiments, the scavenger grille 400 is transparent with a VLT % that is at least 5% and preferably at least 50%, more preferably at least 70%, and most preferably at least 85%.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications, or equivalent arrangements; the present invention being limited only by the claims appended hereto and the equivalents thereof.

What is claimed is:

1. A pet muzzle, comprising:
   (a) a muzzle body, having a closed distal end and an open proximal end, including:
      (i) a continuous snout band, of uniform width, defining the open proximal end and adapted to extend completely around a pet's nose and jaws,
      (ii) a cage, formed by a plurality of interconnected struts defining a plurality of airflow openings, that defines the closed distal end and is carried on, and supported by, the continuous snout band and is adapted to fit over the pet's nose and jaws,
      (iii) wherein the cage is manufactured of transparent material that has a visible light transmittance percentage (VLT %) of at least 50%;
   (b) a strap system connected to the continuous snout band and adapted to hold the cage in place over the pet's nose and jaws;
   (c) wherein, when the pet muzzle is worn by the pet, a person in the vicinity thereof is able to see all or nearly all of the facial expressions of the pet through a combination of the airflow openings and the transparent material of the struts.

2. The pet muzzle of claim 1, wherein the cage is manufactured of material that has a visible light transmittance percentage (VLT %) of at least 70%.

3. The pet muzzle of claim 2, wherein the cage is manufactured of material that has a visible light transmittance percentage (VLT %) of at least 85%.

4. The pet muzzle of claim 1, further comprising a scavenger grille that can be attached and detached to the cage in a mouth opening thereof, and wherein, when the scavenger grille is attached to the cage in the mouth opening thereof, and the cage is held in place over the pet's nose and jaws, the pet is prevented from consuming undesired materials or objects, but when the scavenger grille is detached from the cage and removed, the pet can drink or eat through the mouth opening.

5. The pet muzzle of claim 4, wherein the scavenger grille is manufactured of transparent material that has a visible light transmittance percentage (VLT %) of at least 50%.

6. The pet muzzle of claim 5, wherein the scavenger grille is manufactured of material that has a visible light transmittance percentage (VLT %) of at least 70%.

7. The pet muzzle of claim 6 wherein the scavenger grille is manufactured of material that has a visible light transmittance percentage (VLT %) of at least 85%.

8. The pet muzzle of claim 4, wherein the scavenger grille is made of the same material as the cage.

9. The pet muzzle of claim 1, wherein the cage and the snout band are of integrally-manufactured construction using identical material.

10. The pet muzzle of claim 9, wherein the identical material is injection-molded material.

11. The pet muzzle of claim 1, wherein the cage is injection molded as one shaped part.

12. The pet muzzle of claim 1, wherein the pet muzzle is manufactured from a thermoplastic material that combines benefits of lightness and strength.

13. The pet muzzle of claim 12, wherein the thermoplastic material is a thermoplastic rubber (TPR) material.

14. The pet muzzle of claim 12, wherein the thermoplastic material is a thermoplastic polyurethane (TPU) copolymer material.

15. The pet muzzle of claim 1, wherein, when the pet muzzle is worn by the pet, a person in the vicinity thereof is able to evaluate the pet's health based on changes in nose pigmentation, changes in texture or moisture, or skin conditions of the pet visible through the combination of the airflow openings and the transparent material of the struts.

16. A pet muzzle, comprising:
(a) a muzzle body, having a closed distal end and an open proximal end, including:
  (i) a cage adapted to fit over a pet's nose and jaws and formed by a plurality of interconnected struts defining a plurality of airflow openings,
  (ii) a snout band around the open proximal end,
  (iii) wherein the cage is manufactured of transparent material that has a visible light transmittance percentage (VLT %) of at least 50%;
(b) a strap system adapted to hold the cage in place over the pet's nose and jaws;
(c) wherein, when the pet muzzle is worn by the pet, a person in the vicinity thereof is able to see all or nearly all of the facial expressions of the pet through a combination of the airflow openings and the transparent material of the struts;
(d) wherein the plurality of interconnected struts have thickened transparent portions around edges of the airflow openings and thinner transparent portions in other areas, thereby enhancing structural performance while reducing material requirements.

17. The pet muzzle of claim 16, wherein the plurality of interconnected struts are structural struts shaped by topology optimization.

18. The pet muzzle of claim 16, wherein the cage has an interior side and an exterior side, and wherein the thickened strut portions around the edges of the airflow openings are thicker in a cross-sectional dimension from the interior side of the cage to the exterior side of the cage than the thinner portions in the other areas.

19. The pet muzzle of claim 16, wherein the airflow openings are defined by the edges and wherein the other areas are away from the edges such that the thickened portions of the struts are the portions of the struts around the edges of the airflow openings and the thinner portions of the struts are away from the edges of the airflow openings.

20. A pet muzzle, comprising:
(a) a muzzle body, having a closed distal end and an open proximal end, including:
  (i) a continuous snout band defining the open proximal end and adapted to extend completely around a pet's nose and jaws, and
  (ii) a cage, formed by a plurality of interconnected struts defining a plurality of airflow openings, that defines the closed distal end and is carried on, and supported by, the continuous snout band and is adapted to fit over the pet's nose and jaws such that only the cage, and nothing else, extends distally from the snout band,
  (iii) wherein the cage is manufactured of transparent material that has a visible light transmittance percentage (VLT %) of at least 50%;
(b) a strap system adapted to hold the cage in place over the pet's nose and jaws;
(c) whereby, when the pet muzzle is worn by the pet, a distal portion of the pet's nose and jaws is surrounded only by the cage, and nothing else, such that a person in the vicinity thereof is able to see all or nearly all of the facial expressions of the pet through a combination of the airflow openings and the transparent material of the struts.

* * * * *